US009500091B2

(12) United States Patent
Delapierre et al.

(10) Patent No.: US 9,500,091 B2
(45) Date of Patent: Nov. 22, 2016

(54) WEAR-RESISTANT PART FOR THE SUPPORT OF A BLADE OF A TURBOJET FAN

(75) Inventors: Michael Delapierre, Paris (FR); Patrick Jean-Louis Reghezza, Vaux le Penil (FR)

(73) Assignee: SNECMA, Paris (FR)

( * ) Notice: Subject to any disclaimer, the term of this patent is extended or adjusted under 35 U.S.C. 154(b) by 1086 days.

(21) Appl. No.: 13/639,186

(22) PCT Filed: Apr. 28, 2011

(86) PCT No.: PCT/FR2011/050969
§ 371 (c)(1),
(2), (4) Date: Oct. 3, 2012

(87) PCT Pub. No.: WO2012/072903
PCT Pub. Date: Jun. 7, 2012

(65) Prior Publication Data
US 2013/0101421 A1  Apr. 25, 2013

(30) Foreign Application Priority Data
Apr. 28, 2010 (FR) ........................ 10 53270

(51) Int. Cl.
*F01D 5/30* (2006.01)

(52) U.S. Cl.
CPC ............ *F01D 5/3092* (2013.01); *Y02T 50/672* (2013.01); *Y02T 50/673* (2013.01)

(58) Field of Classification Search
CPC .............. F01D 5/02; F01D 5/10; F01D 5/16; F01D 5/3007; F01D 5/3023; F01D 5/3092; F01D 5/323
See application file for complete search history.

(56) References Cited

U.S. PATENT DOCUMENTS

| 4,417,854 A | * | 11/1983 | Cain | ........................ F01D 5/284 |
| | | | | 416/219 R |
| 5,205,713 A | * | 4/1993 | Szpunar | ..................... F01D 5/26 |
| | | | | 416/193 A |

(Continued)

FOREIGN PATENT DOCUMENTS

| DE | 10 2004 006 706 A1 | 8/2005 |
| EP | 1 306 523 A1 | 5/2003 |

(Continued)

OTHER PUBLICATIONS

International Search Report and Written Opinion issued Apr. 24, 2012 in PCT/FR2011/050969 filed Apr. 28, 2011 (with English-language translation of the International Search Report).

*Primary Examiner* — Eric Keasel
*Assistant Examiner* — Danielle M Christensen
(74) *Attorney, Agent, or Firm* — Oblon, McClelland, Maier & Neustadt, L.L.P.

(57) ABSTRACT

An aircraft turbojet fan including multiple fan blades including a support that includes a rear portion including a first surface located on an intrados side and a second surface located on an extrados side. A fan disk includes, between recesses, attaching flanges radially protruding towards the outside such that the first surface and the second surface are located respectively opposite two attaching flanges. The fan further includes a wear-resistant part installed on the blade to form a protective shell on each of the first and second surfaces of the support, preventing contact between each surface and the attaching flange located opposite it.

9 Claims, 5 Drawing Sheets

(56) References Cited

U.S. PATENT DOCUMENTS

| | | | |
|---|---|---|---|
| 5,240,375 A * | 8/1993 | Wayte | F01D 5/28 416/219 R |
| 5,791,877 A * | 8/1998 | Stenneler | F01D 5/22 416/204 A |
| 6,431,835 B1 | 8/2002 | Kolodziej et al. | |
| 2002/0044870 A1 | 4/2002 | Simonetti et al. | |
| 2003/0194321 A1 | 10/2003 | Barnette et al. | |
| 2004/0258528 A1 | 12/2004 | Goga et al. | |
| 2008/0003108 A1 | 1/2008 | Forgue et al. | |
| 2008/0019836 A1 | 1/2008 | Butz et al. | |
| 2009/0022593 A1 | 1/2009 | Oka | |
| 2009/0081046 A1 | 3/2009 | Mace et al. | |
| 2010/0226777 A1 | 9/2010 | Forgue et al. | |

FOREIGN PATENT DOCUMENTS

| | | |
|---|---|---|
| EP | 1 355 045 A2 | 10/2003 |
| EP | 1 764 480 A1 | 3/2007 |
| EP | 1 873 401 A2 | 1/2008 |
| EP | 1 995 467 A1 | 11/2008 |
| EP | 2 042 689 A1 | 4/2009 |
| GB | 836030 | 6/1960 |
| JP | 2007077993 A * | 3/2007 |

\* cited by examiner

WEAR-RESISTANT PART FOR THE SUPPORT OF A BLADE OF A TURBOJET FAN

TECHNICAL FIELD

The present invention relates to the field of turbojet fans for aircraft, and more specifically to that of blade supports fitted to these fans.

STATE OF THE PRIOR ART

An aircraft turbojet fan habitually includes multiple fan blades installed in a fan disk. The disk defines on its periphery multiple recesses spaced tangentially relative to one another, each of which holds the root of a blade. Each blade also includes an aerodynamic vane, together with a support interposed between this vane and the blade root.

The support is thinner than the root, in order that it may traverse the upper aperture defined by the corresponding recess, and thus allow the mechanical linkage between the vane fitted outside the recess, and the root held inside it. The support includes a rear portion which is located near a rear end of the disk, where this rear portion of the support includes a first surface located on the intrados side of the vane, and a second surface located on the extrados side of this vane.

Both these opposite surfaces are facing an attaching flange incorporated in the fan disk, which protrudes radially towards the outside. In a known manner, these attaching flanges are installed between the recesses, at the rear end of the disk, and are used to attach the drum to the disk.

This design, although very conventional, and widely used in aircraft turbojets, nevertheless has a non-negligible disadvantage, namely the premature wear and tear of the first and second rear surfaces of the support. Investigations have enabled it to be demonstrated that this wear and tear resulted from the friction between these surfaces and their facing attaching flanges, essentially during the phases of autorotation of the fan, also called windmilling phases.

During these autorotation phases, indeed, the blade tends to oscillate in an axis passing through the blade root and parallel to the longitudinal axis of the fan, between two extreme positions determined by the two attaching flanges, which act as tangential stops for the blade support. The clearance initially set between this support and both the attaching flanges fitted either side of it is therefore consumed, and the resulting friction leads to premature wear and tear in each of the first and second rear surfaces of the support.

This wear and tear takes the form of the creation of two impressions on the rear surfaces of the support, and these impressions gradually become deeper over the lifetime of the blade.

A first detrimental consequence of these impressions is to weaken the overall mechanical resistance of the support.

In addition to this disadvantage is that of the increased clearance between the worn surfaces of the support and their facing attaching flange. The amplitude of the oscillation of the blade found during the autorotation phases then increases, accelerating the wear and tear effect. In addition, if a blade adjacent to a given blade is lost, the substantial forces resulting from the impact, to which the given blade is subject, tend to make it pivot with a higher amplitude, before it is stopped by the attaching flange acting as the tangential stop, which increases risks of fracture and loss of this same given blade.

DESCRIPTION OF THE INVENTION

The purpose of the invention is therefore to provide at least partially a solution to the disadvantages mentioned above, compared with the embodiments of the prior art.

To accomplish this, a first object of the invention is an aircraft turbojet fan including multiple fan blades, together with a disk defining multiple recesses on its periphery, where each blade includes an aerodynamic vane, a blade root held in one of the said recesses, and a support interposed between the vane and the root, where the said support includes a rear portion including a first surface located on the intrados side of the vane, and a second surface located on the extrados side of this vane, and the fan disk including, between the recesses, attaching flanges protruding radially outwards such that the first surface and the second surface are located respectively opposite the two attaching flanges.

According to the invention, in respect of at least one of the said blades, the fan includes a wear-resistant part installed on the blade so as to form a protective shell on each of the first and second surfaces of the support, preventing contact between each surface and the attaching flange located opposite it.

The wear-resistant part used in the invention therefore protects both rear surfaces of the blade support, and thus prevents the wear impressions from being formed on them. This strengthens the support's mechanical resistance, and more generally the blade's overall mechanical resistance.

In addition, the absence of wear impressions on both rear surfaces of the support enables the amplitude of oscillation of the blade to be limited during autorotation phases of the fan, and also enables the pivot amplitude of any given blade impacted by a fractured adjacent blade to be limited.

These amplitudes, defined by the attaching flanges forming tangential stops for the blade support, are also reduced by the thickness of the protective shells, which are effectively inserted between the rear surfaces of the support and their associated attaching flange. With these reduced amplitudes of oscillation, the wear of the blade and of all its surrounding elements is advantageously reduced.

The wear-resistant part can advantageously be applied to new fan blades, as they leave production, or alternatively to blades which have already been brought into operation, as a maintenance solution. In the latter case, a notable advantage of the invention lies in the possibility of installing the wear-resistant part on a blade without having to disassemble the entire turbojet, since this operation can, indeed, be undertaken "under the wing" of the aircraft.

If the part is worn it can naturally be changed easily. The blade can then continue to be used in its current condition, thereby increasing its lifetime.

In addition, in light of the particular positioning of the wear-resistant part in the fan, its risks of losses are extremely low, even in the event that the fan is fractured.

Furthermore, it is recommended that such a wear-resistant part should preferentially be fitted to all the blades of the fan, resulting therefore in no unbalance which might require the fan to be rebalanced.

The said wear-resistant part is preferably installed on the blade by clip fixing. The operation is consequently simple and fast. However, other installation solutions could be envisaged, such as that of bonding, for example using a thermosetting adhesive.

In this scenario the said wear-resistant part is preferentially installed on the blade by clip fixing on a platform of the blade.

Each protective shell is preferably between 0.2 and 0.5 mm thick.

The said wear-resistant part is preferably manufactured from an alloy containing 80% nickel, 14% chromium and 6% iron, such as an Inconel alloy, and preferably the alloy Inconel 718. This material can be identical or similar to the one used to manufacture the blade support.

Alternatively, this could be a composite material with high mechanical resistance.

The said wear-resistant part is preferably manufactured by cutting and folding a metal plate. Alternatively, it could be manufactured by machining, or again by powder metallurgy.

As previously mentioned, each of the blades of the fan is preferably fitted with a wear-resistant part.

Another object of the invention is an aircraft turbojet including a fan as described above.

A final object of the invention is also a wear-resistant part intended to be installed on a blade of an aircraft turbojet fan, as described above, so as to form a protective shell on each of the first and second surfaces of the blade support.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PARTICULAR EMBODIMENTS

Figure 1:
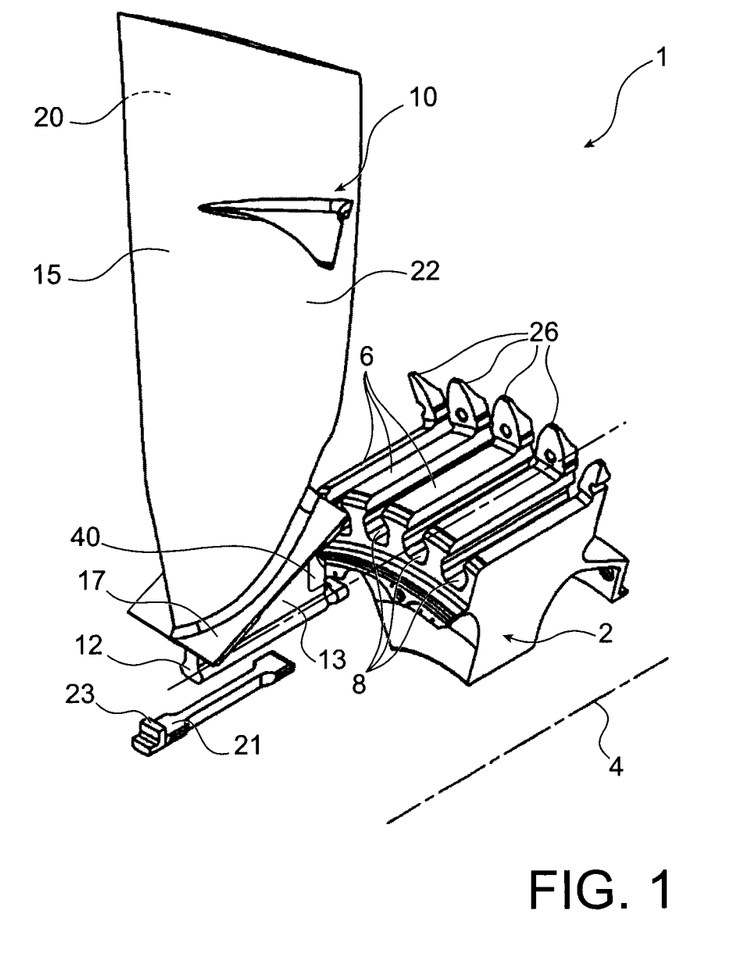
FIG. 1 represents an exploded perspective view of a portion of an aircraft turbojet fan, according to a preferred embodiment of the present invention.
Figure 2:
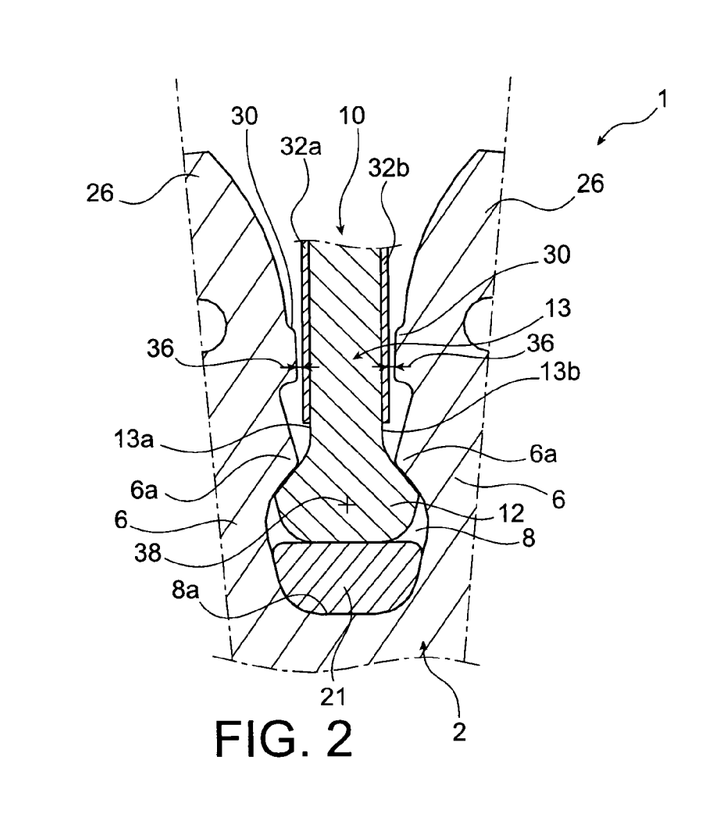
FIG. 2 represents a partial transverse section view of the fan shown in FIG. 1, passing through the attaching flanges of the fan disk.

With reference firstly to FIGS. 1 and 2, a portion of an aircraft turbojet fan 1 according to a preferred embodiment of the present invention is represented.

It globally includes a disk 2 centred on longitudinal axis 4 of the fan, a disk on the periphery of which teeth 6 spaced circumferentially relative to one another are manufactured, and where each extends roughly longitudinally and radially, i.e. roughly parallel to axis 4. Between two teeth 6 which are directly consecutive in the circumferential/tangential direction, these teeth delimit a recess 8 intended to accommodate root 12 of a fan blade 10.

In a known manner, the head of each tooth 6 is enlarged so as to be able to hold the blades in the radial direction towards the outside. In other words, recess 8 has a narrowed external radial end allowing blade 10 to be moved from support 13, the section/thickness of which blade is narrowed relative to that of its root 12. Thus, the given assembly is of the dovetail type, or again of the "Christmas tree decoration" type.

In addition to support 13 and blade root 12 mounted on the inner radial end of this support, blade 10 has an aerodynamic vane mounted on the outer radial end of the support. At the junction between these two elements, blade 10 also has a platform 17 intended to be followed externally by the airflow traversing the fan. This platform 17, which extends tangentially either side of vane 15, from the base of intrados 20 and extrados 22 of the latter, is aerodynamically continuous with a fan nose dome (not represented).

In addition, associated with each blade 10, fan 1 includes a shim 21 interposed between the lower end of blade root 12, and a base 8a of the recess associated with the blade concerned.

Figure 5A:
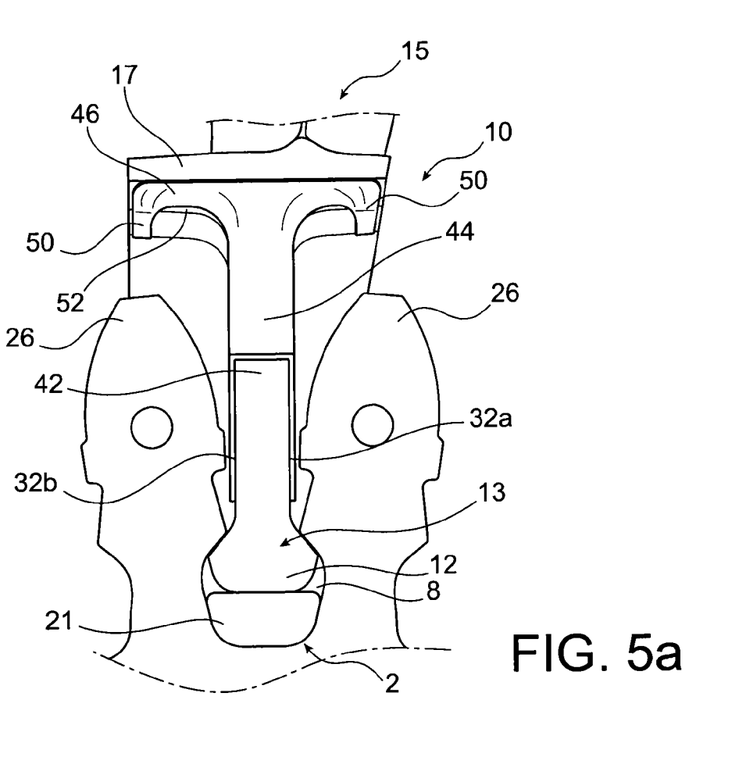
FIGS. 5a to 5d represent perspective views of a lower rear portion of one of the blades fitted with its wear-resistant part, from various viewpoints.
Figure 5B:
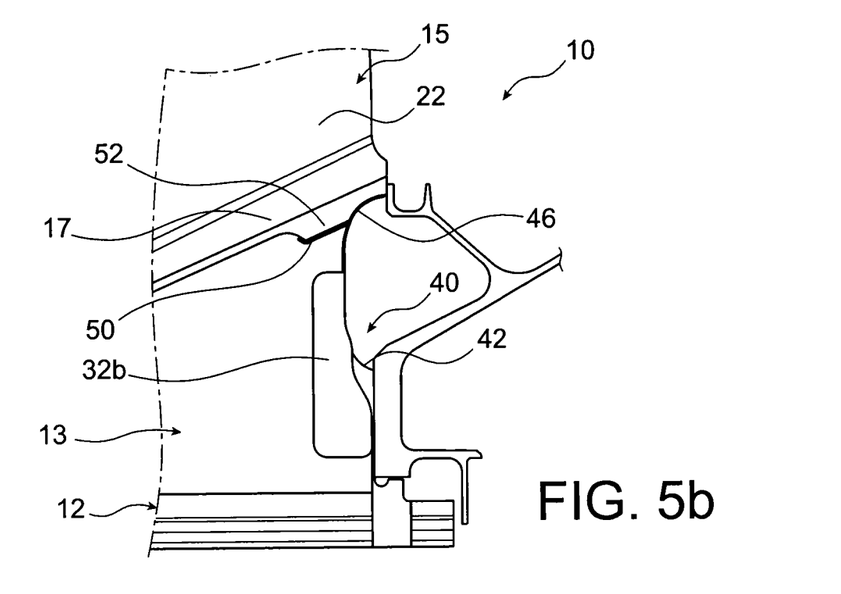
Figure 5C:
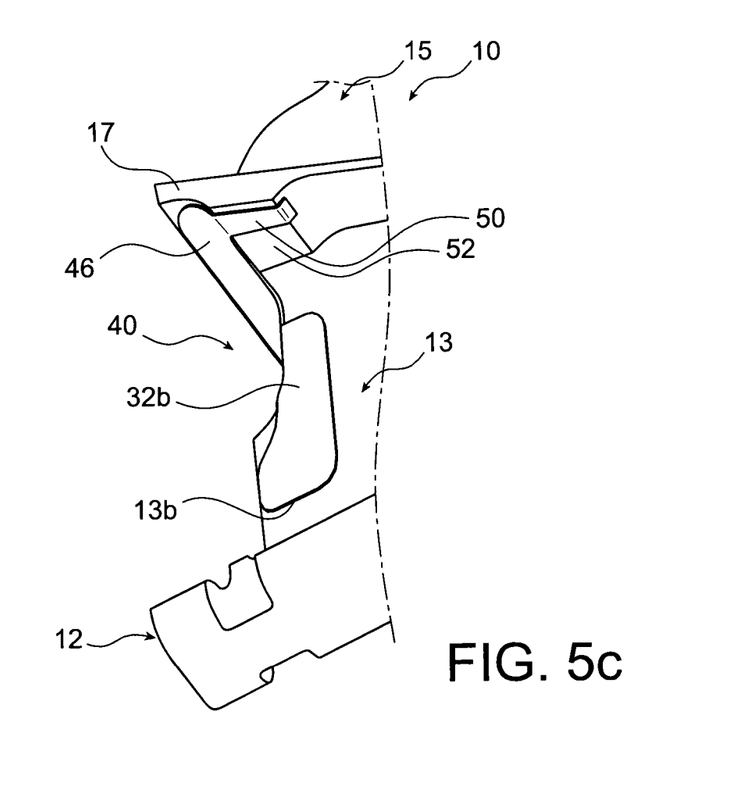

As can be seen more clearly in FIG. 2, shim 21 enables blade 10 to be positioned in the radial direction towards the interior when the fan is not rotating. In addition, shims 21 allow the installation of fan blades 12 fitted with an axial retaining hook (which can be seen in FIGS. 5b and 5c), located downstream, which is slid into the drum's retaining slots. In addition, as can be seen in FIG. 1, shim 21 includes upstream a stop 23 for axial retention of its associated blade.

Although this has not been represented, one or more vibration-dampening fan shims radially interposed between platform 17 of the blade and the periphery of disk 2, defined by the radially external surface of teeth 6, may been installed. This shim takes, overall, the form of an elastomer block fitted with contact plates designed to reduce the levels of vibration of the fan blades.

Furthermore, disk 2 includes attaching flanges 26 protruding radially towards the outside from a rear end of teeth 6. These flanges 26, preferably manufactured in a single piece with teeth 6, are thus fitted between recesses 8, as can be seen in FIGS. 1 and 2. In the represented embodiment, a single flange is installed on each tooth, pierced with an aperture to allow the passage of a bolt used to attach the drum.

As can be seen more clearly in FIG. 2, the rear portion of each support 13 traverses the upper opening of recess 8. It includes a first surface 13a located on the intrados side of vane 10 and a second surface 13b located on the extrados side of this vane, where both these surfaces 13a, 13b of the support are parallel with one another, and facing one another. First surface 13a is located opposite enlarged end 6a of one of the teeth 6 forming the opening of the corresponding recess, whereas the second surface 13b is located opposite enlarged end 6a of another directly consecutive tooth 6, also forming the opening of the same recess 8. In addition, each of these two surfaces 13a, 13b extends radially towards the outside, facing one of the attaching flanges 26, particularly facing a tangential stop 30 manufactured on the latter.

According to a feature of invention, a wear-resistant part is installed on each blade 10 so as to form a protective shell 32a, 32b on each of the first and second surfaces 13a, 13b of the support, preventing contact between these surfaces 13a, 13b and attaching flanges 26 located opposite.

During normal operation of the fan, essentially due to the centrifugal force, blades 10 are aligned such that the first protective shell 32a covering first support surface 13a is located at a tangential distance from stop 30 opposite, and a tangential clearance can be observed. The same goes for the second protective shell 32b covering second support surface 13b, where this shell 32b is located at a tangential distance from stop 30 opposite, and a tangential clearance 36 is also observed. There is therefore no contact between the protective shells and the attaching flanges.

Figure 3:
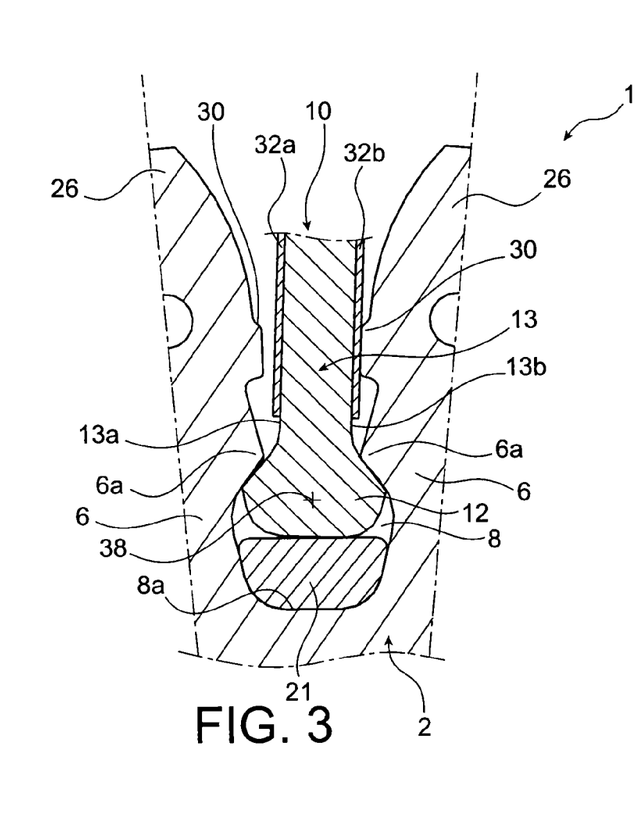
FIG. 3 represents a view similar to that of FIG. 2, with the blade shown in a pivoting position found during a phase of autorotation of the fan.

Conversely, during the phases of autorotation of the fan, also called windmilling phases, each blade 10 tends to oscillate along axis 38 passing through root 12 and parallel to axis 4, between two extreme positions determined by the two tangential stops 30, 30. In these extreme positions, one of which is represented in FIG. 3, one of the initial clearances 36 is entirely consumed, which leads to a mechanical contact between the protective shell and its associated stop 30. The shells therefore prevent direct contact between the support and the stops in the extreme positions of the blade, which limits wear and tear by friction of this support.

Figure 4:
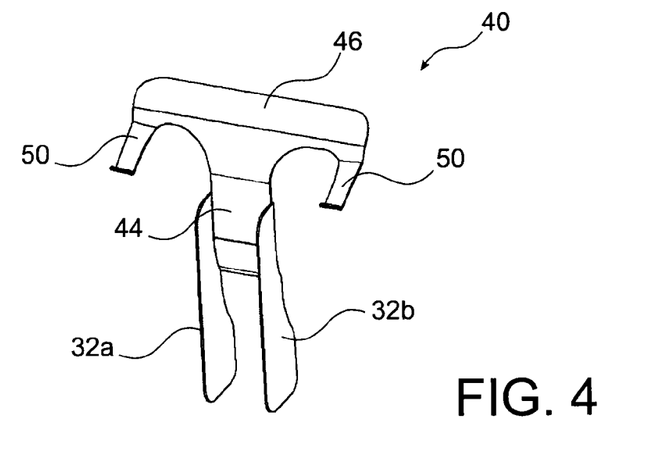
FIG. 4 represents a perspective view of the wear-resistant part fitted to the fan blades.
Figure 5D:
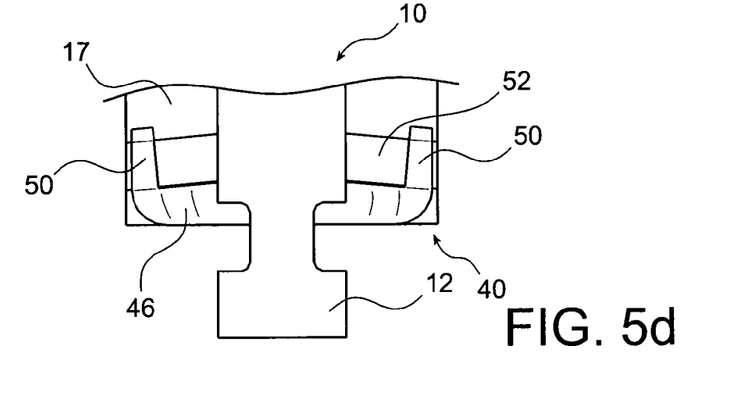

FIGS. 4 to 5d show an example embodiment of wear-resistant part 40 incorporating both protective shells 32a, 32b.

This part 40 is designed to be manufactured from a metal plate, preferably one made from the alloy Inconel 718, which is flat in shape and between 0.2 and 0.5 mm thick, and which is then cut and folded to obtain the desired final shape.

Indeed, part 40 incorporates both parallel shells 32a, 32b, each one of which is essentially rectangular in shape, and one of the lengths of which is partly indented to follow the convex profile of a portion of rear edge 42 of support 13. Both shells are connected at their upper ends by a linking portion 44, corresponding to the lower portion of the base of a T, which is roughly orthogonal to both shells 32a, 32b.

The upper portion of the base of the T follows the portion of the rear edge 42 of support 13 which joins platform 17. For its part, the upper branch of the T, referenced 46 and mounted on base 44, follows an internally radially rear portion of platform 17, extending in the tangential direction either side of vane 15. At the two opposite ends of this branch 46 two clips 50 are installed which are used to position and hold wear-resistant part 40 on blade 10.

Each clip 50 is shaped like a U-shaped elastic tongue, the base of which extends roughly axially, and the two lateral branches of which are roughly open, radially aligned towards the outside. These two branches are used to fit tightly around a protrusion 52 of platform 17, which extends radially towards the inside. It is therefore the gripping of this protrusion 52, by both branches of each of the U-shaped clips, which enables wear-resistant part 40 to be installed on the blade. This clamping may possibly be accompanied by another form of clamping, procured by a gripping force of the elastic assembly constituted by both shells 32a, 32b and of base 44 of the T, on the rear portion of support 13. In this case, this elastic assembly then acts as a bed frame. Alternatively, a small clearance could be made between each of the two shells 32a, 32b and their associated surface 13a, 13b.

Figure 6A:
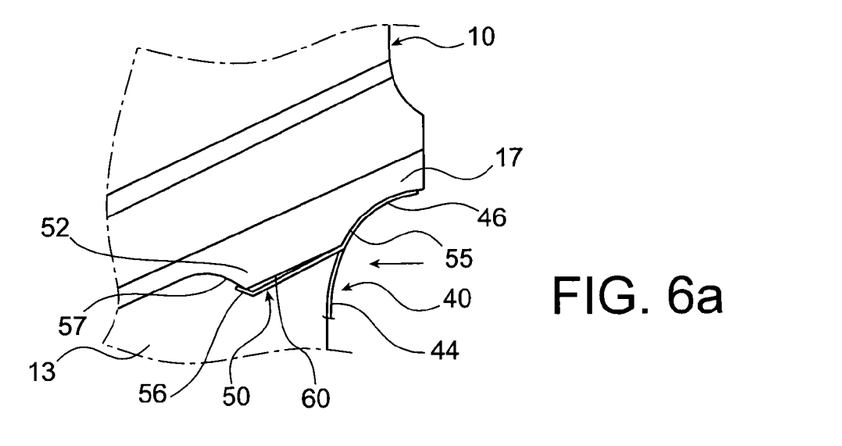
FIGS. 6a and 6b represent schematic views explaining the installation by clip fixing of the wear-resistant part on its blade.
Figure 6B:
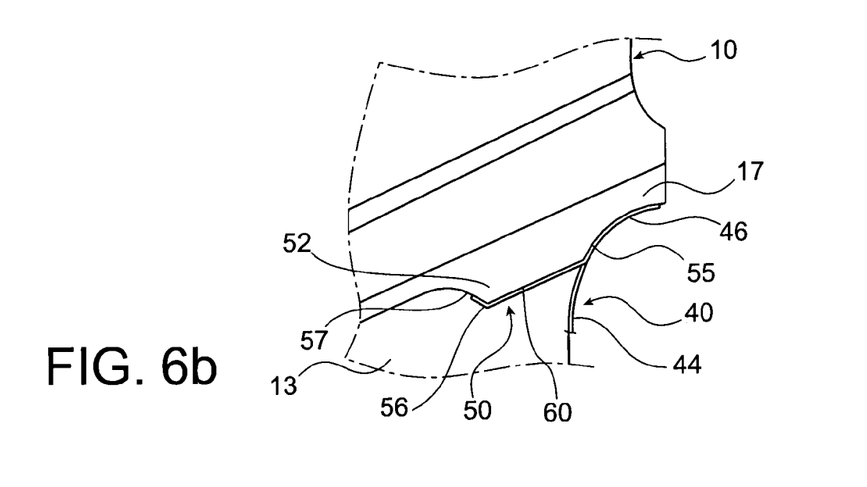

In FIGS. 6a and 6b, the installation of the wear-resistant part using clips 50 has been schematised. For each clamp 50, the branch of the U which is connected to the upper branch of T 46 is firstly applied against a face 55 of protrusion 52 of platform 17, before the other branch of the U, referenced 56, is forced forwards and upwards in order to clamp it on an opposite face 57 of this protrusion 52. The clip fixing is obtained when this free branch of U 56 extends beyond the ridge between face 57 and radially internal face 60 of the protrusion connecting the two opposite faces 55, 57. The passage of the ridge therefore forms the hard point of this assembly by clipping.

Naturally, various modifications can be made by the skilled man in the art to the invention which has just been described, solely as non-restrictive examples.

The invention claimed is:

1. An aircraft turbojet fan comprising:
a fan blade, together with a fan disk including teeth defining a recess between two directly consecutive teeth on a periphery thereof, the two directly consecutive teeth delimiting the recess, wherein each blade includes an aerodynamic vane, a blade root held in the recess, and a support interposed between the vane and the root,
the support includes a rear portion including a first surface located on an intrados side of the vane, and a second surface located on an extrados side of the vane,
the fan disk including, between the recess, attaching flanges protruding radially outwards from a rear end of the teeth such that the first surface and the second surface are located respectively opposite two attaching flanges, each attaching flange being pierced with an aperture,
wherein the fan includes a wear-resistant part installed on the blade to form a protective shell on each of the first and second surfaces of the support, preventing contact between each surface and the respective attaching flange located opposite the surface, and
wherein the wear-resistant part includes at least one clip, and the wear-resistant part is installed on the blade by clip fixing on a platform of the blade via the at least one clip.

2. A fan according to claim 1, wherein each protective shell is between 0.2 and 0.5 mm thick.

3. A fan according to claim 1, wherein the wear-resistant part is manufactured from an alloy containing 80% nickel, 14% chromium, and 6% iron.

4. A fan according to claim 1, wherein the wear-resistant part is manufactured by cutting and folding a plate.

5. A fan according to claim 1, wherein each of the blades of the fan is fitted with a wear-resistant part.

6. A turbojet for aircraft including a fan according to claim 1.

7. A fan according to claim 1, wherein the wear-resistant part is T-shaped and includes a linking portion corresponding to a base of a T and an upper branch mounted on the linking portion, the linking portion including first and second members forming the protective shell on the first and second surfaces, wherein the at least one clip is a plurality of clips, and the clips are provided on opposite ends of the upper branch for clip fixing the wear-resistant part on the platform of the blade.

8. A fan according to claim 7, wherein each presents a U-shape.

9. A fan according to claim 1, wherein a tangential stop protruding towards the recess and facing the support is provided on the attaching flanges.

* * * * *

UNITED STATES PATENT AND TRADEMARK OFFICE
CERTIFICATE OF CORRECTION

PATENT NO. : 9,500,091 B2
APPLICATION NO. : 13/639186
DATED : November 22, 2016
INVENTOR(S) : Mickael Delapierre et al.

It is certified that error appears in the above-identified patent and that said Letters Patent is hereby corrected as shown below:

In the Claims

Column 6, Line 55, change "each presents" to --each clip presents--.

Signed and Sealed this
First Day of May, 2018

Andrei Iancu
*Director of the United States Patent and Trademark Office*